US006224065B1

(12) United States Patent
Smith

(10) Patent No.: US 6,224,065 B1
(45) Date of Patent: May 1, 2001

(54) FACE SEAL WITH INNER AND OUTER SEAL RETAINER MEMBERS

(75) Inventor: David P. Smith, Joliet, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/306,978

(22) Filed: May 7, 1999

(51) Int. Cl.$^7$ .................................................. F16L 17/06
(52) U.S. Cl. ........................ 277/611; 277/626; 277/644; 277/654
(58) Field of Search .................................. 277/611, 615, 277/616, 626, 627, 638, 639, 644, 652, 654, 584

(56) References Cited

U.S. PATENT DOCUMENTS

| | | |
|---|---|---|
| 735,782 | 8/1903 | Lakeberg . |
| 2,882,083 | 4/1959 | Palumbo et al. ........................ 288/28 |
| 3,279,805 * | 10/1966 | Quinson ................................ 277/611 |
| 3,336,035 | 8/1967 | Price .................................... 277/204 |
| 3,355,181 * | 11/1967 | Olson ................................... 277/611 |
| 3,467,398 * | 9/1969 | Bernard ................................ 277/639 |
| 3,531,133 * | 9/1970 | Sheesley et al. ..................... 277/611 |
| 3,854,731 | 12/1974 | Gealt ..................................... 277/26 |
| 4,019,244 | 4/1977 | Owen et al. ............................ 29/520 |
| 4,095,809 * | 6/1978 | Smith ................................... 277/611 |
| 4,214,761 | 7/1980 | Pippert ................................. 277/123 |
| 4,673,187 | 6/1987 | Hanson et al. .......................... 277/26 |
| 4,795,174 | 1/1989 | Whitlow ............................... 277/213 |
| 5,094,290 | 3/1992 | Buckreus ............................... 165/83 |
| 5,222,744 * | 6/1993 | Dennys ................................. 277/608 |
| 5,308,090 | 5/1994 | Hamada et al. ...................... 277/204 |
| 5,509,669 | 4/1996 | Wolfe et al. ......................... 277/167.5 |
| 5,511,797 * | 4/1996 | Nikirk et al. ......................... 277/609 |
| 5,669,613 * | 9/1997 | Lubienski ............................. 277/610 |
| 5,913,522 * | 6/1999 | Koch ................................... 277/610 |

* cited by examiner

Primary Examiner—Anthony Knight
Assistant Examiner—Alison K. Pickard
(74) Attorney, Agent, or Firm—Haverstock, Garrett & Roberts; J. W. Burrows

(57) ABSTRACT

A face seal for forming a sealed condition between two spaced, opposed surfaces. The face seal includes an inner seal retainer member and an outer seal retainer member each defining an area having an axis therethrough. The inner and outer seal retainer members each having a first axial end portion, an opposite second axial end portion, and an axial extent as measured between the first axial end portion and the second axial end portion. The outer seal retainer member is disposed radially outwardly of the inner seal retainer member, defining a space therebetween. An elastomeric seal member having an axial extent longer than the axial extent of the first and second inner and outer seal retainer members is disposed in a predetermined portion of the space between the inner seal retainer member and the outer seal retainer member. The seal member is deformable so as to conform to the spaced, opposed surfaces for forming the sealed condition therewith and to expand into a portion of the space between the seal member and the retainer members when subject to a compressive force applied by the opposed surfaces.

4 Claims, 2 Drawing Sheets

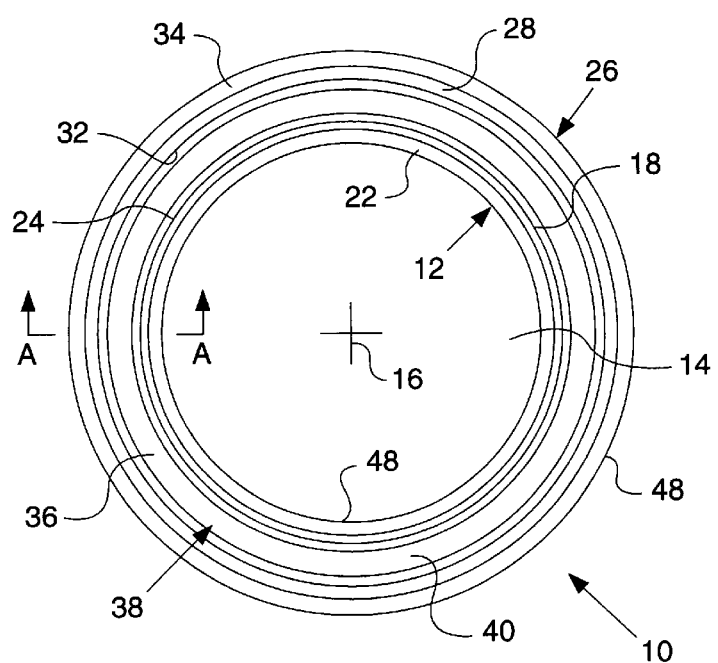
Fig-1-
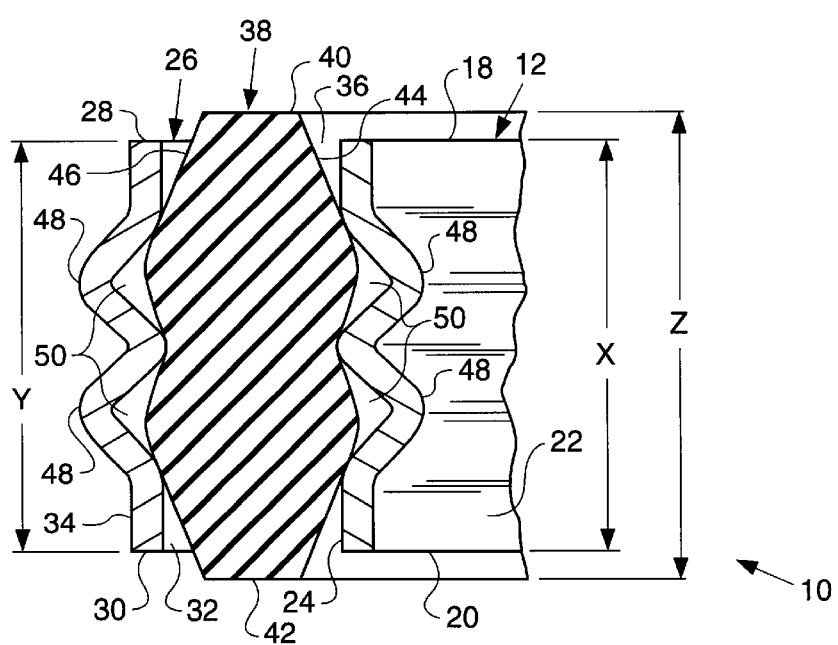
Fig-2-

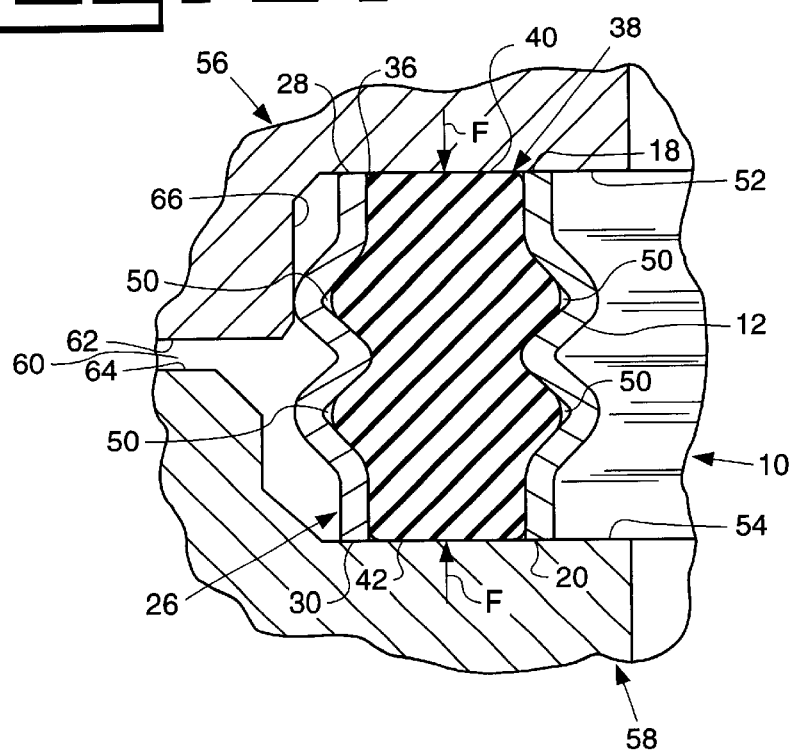
Fig-3-
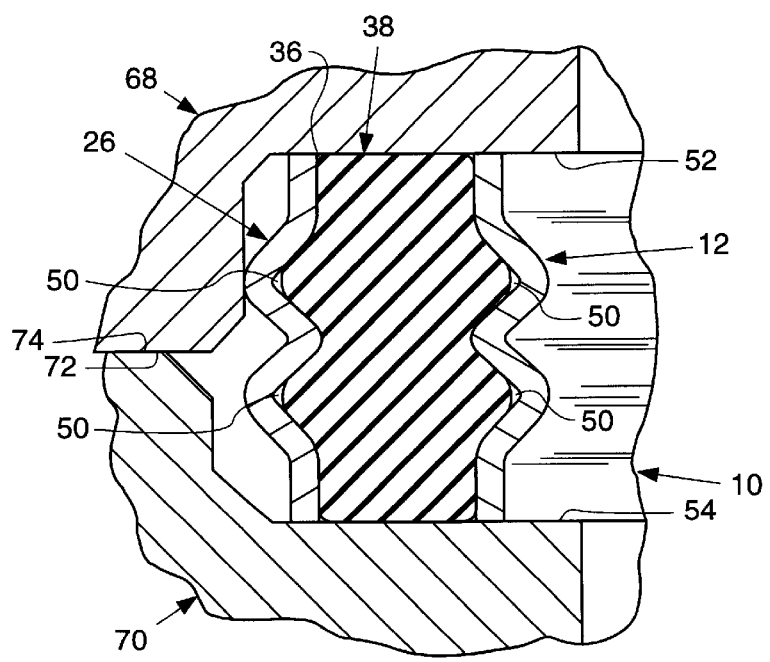
Fig-4-

FACE SEAL WITH INNER AND OUTER SEAL RETAINER MEMBERS

TECHNICAL FIELD

This invention relates generally to face type seals, and more particularly, to a face type seal including inner and outer seal retainer members for protecting an elastomeric element of the seal during assembly, retaining the seal at disassembly, and enhancing the sealing function.

BACKGROUND ART

Face type seals, that is, seals having at least one axial sealing face for forming a sealed condition in engagement with an opposing flat surface, are well known in the art. Commonly, O-rings are used as face seals. Other known face seals include bifurcated elastomeric sealing elements having a peripheral rim for isolating or shielding a main sealing element from sudden pressure changes on the rim side of the seal which can cause extrusion of the main sealing element. This rim also protects the main sealing element during handling and installation. To provide a satisfactory sealing function under high pressure conditions, particularly to avoid extrusion of the elastomeric sealing components into adjacent spaces, the known face seals also typically have a relatively large area of contact with the opposing surface, which is known as the seal area. However, a large seal area has the accompanying shortcoming of a correspondingly large joint or seal separation load, that is, a force generated by the seal urging to open or separate the sealed joint. The larger the joint separation load, the greater the force required to keep the joint closed. This means that more and/or larger fasteners are required, which increases cost.

The opposing surface with which the face seal forms the sealed condition is typically lapped, ground or milled to achieve a high degree of flatness. However, the lapping, grinding and milling operations can produce very small scratches that extend across the surface, thereby providing a potential leak path past the seal. Scratches can also be accidentally formed across the surface during handling. To avoid these problems, manufacturers typically impose stringent surface finish requirements on these surfaces which add to their manufacturing cost.

Additionally, many manufactured assemblies include component parts requiring more than one face seal therebetween, for instance, for forming sealed conditions around multiple passages or conduits extending between the components, requiring that the multiple sealed conditions be formed simultaneously as the components are assembled. This can be problematic in instances wherein the opposed surfaces with which the seals are to form the sealed conditions are not uniformly spaced apart, as this can result in varying degrees of compression of the respective seals when the components are assembled. To overcome the above-referenced scratching problem, it is known to produce the opposing surfaces with which the seals are to form the sealed conditions using spot facing and counterboring techniques wherein only circumferentially extending scratches are produced. This enables flatness and surface finish tolerances to be relaxed. It has also been found that many known spot face machines can hold very close axial or depth tolerances such that multiple spot faces produced on a component can be very closely co-planar. This is significant because when two components are assembled, a very uniform spaced apart relationship between the spot faces and opposing surfaces can be achieved. When the components are fastened together with multiple face seals installed for forming sealed conditions with the respective spot faces, more uniform, predictable sealing characteristics can be achieved.

What is now desired, therefore, is a face seal to more fully exploit the advantages of the available counterboring and spot facing techniques, which seal lowers manufacturing and assembly costs, and provides more uniform, positive sealing capabilities.

Accordingly, the present invention is directed to overcoming one or more of the problems as set forth above.

DISCLOSURE OF THE INVENTION

In one aspect of the present invention, a face seal for forming a sealed condition between two spaced, opposed surfaces which provides many of the advantages set forth above is disclosed. The present face seal includes an inner seal retainer member defining an area having an axis therethrough, the inner seal retainer member having a first axial end portion, an opposite second axial end portion, and a predetermined axial extent as measured between the first axial end portion and the second axial end portion. The seal includes an outer seal retainer member including a first axial end portion and an opposite second axial end portion, the outer seal retainer member having a predetermined axial extent as measured between the first axial end portion thereof and the second axial end portion thereof. The outer seal retainer member is disposed radially outwardly of the inner seal retainer member, defining a space therebetween. An elastomeric seal member is disposed in a predetermined portion of the space between the inner seal retainer member and the outer seal retainer member. The elastomeric seal member has a first axial sealing face, an opposite second axial sealing face, and a predetermined axial extent as measured between the first axial sealing axial face and the second axial face when in a free state which is greater than the axial extents of the seal retainer members so as to extend beyond the opposite axial end portions of both retainer members. At least one cavity is provided between the seal member and the retainer members, and the seal member is deformable so as to conform to the opposed surfaces for forming the sealed condition therewith and to expand into the at least one cavity when subject to a compressive force applied by the opposed surfaces.

BRIEF DESCRIPTION OF THE DRAWINGS

FIG. 1 is an end view of a face seal according to the present invention;

FIG. 2 is a sectional view taken along line A—A of FIG. 1, showing the face seal with an elastomeric seal member thereof in a free state;

FIG. 3 is a sectional view of the face seal of FIG. 1 showing the elastomeric seal member thereof subject to compressive axial loading between two spaced, opposed surfaces of members of an assembly for forming a sealed condition therebetween; and FIG. 4 is another sectional view of the face seal of FIG. 1, shown under compressive axial loading between two spaced, opposed surface of other members for forming a sealed condition therebetween.

BEST MODE FOR CARRYING OUT THE INVENTION

Referring now to the drawings, wherein like reference numbers refer to like parts, FIGS. 1 and 2 show a face seal 10 constructed and operable according to the teachings of the present invention. Face seal 10 is adapted for forming a sealed condition between spaced, opposed surfaces of a variety of components or members of assemblies such as, but not limited to, hydraulic assemblies such as motors, pumps and manifolds, and other assemblies such as engines and the like, for preventing leakage of pressurized conditions, fluids, and the like from or into areas defined by the face seal 10.

Face seal 10 includes an annular inner seal retainer member 12 constructed of a generally rigid material such as steel defining an area 14 including a central axis 16 therethrough. Inner seal retainer member 12 includes a first axial end portion 18, an opposite second axial end portion 20, a radial inner peripheral surface 22 extending around area 14, and an opposite radial outer peripheral surface 24. Inner seal retainer member 12 has an axial extent denoted by the letter X, as measured between first axial end portion 18 and second axial end portion 20, having a predetermined value when retainer member 12 is in a free state, that is, when not subject to external axial loading causing compression thereof.

Face seal 10 includes an annular outer seal retainer member 26 also constructed of a generally rigid material such as steel having a first axial end portion 28, an opposite second axial end portion 30, and a radial inner peripheral surface 32 and a radial outer peripheral surface 34 extending therebetween. Outer seal retainer member 26 has an axial extent, denoted by the letter Y, as measured between first axial end portion 28 and second axial end portion 30 thereof, having a predetermined value when retainer member 26 is in the free state. Outer seal retainer member 26 is located radially outwardly of inner seal retainer member 12, such that retainer members 12 and 26 define an annular space 36 therebetween.

An annular, elastomeric seal member 38 is disposed in space 36, seal member 38 having a first axial sealing face 40, an opposite second axial sealing face 42, and a radial inner peripheral surface 44 and a radial outer peripheral surface 46 extending between faces 40 and 42. Seal member 38 has an axial extent denoted by the letter Z, as measured between sealing faces 40 and 42, having a predetermined value when in the free state, that is, a state wherein no external axial force or load is applied thereagainst, which is greater than both the free state axial extent X of inner seal retainer member 12 and the free state axial extent Y of outer seal retainer member 26 such that seal member 38 extends axially beyond retainer members 12 and 26 in both axial directions. Retainer members 12 and 26 include a plurality of corrugations 48 that extend circumferentially therearound and define circumferential cavities 50 which are portions of space 36 located between the respective retainer members 12 and 26, and seal member 38.

Referring also to FIG. 3, when seal member 38 of seal 10 is subjected to axially compressive loading, as denoted by arrows F, for instance by spaced, opposed surfaces 52 and 54 of members 56 and 58, axial sealing faces 40 and 42 of seal member 38 will deform into adjacent portions of space 36 so as to substantially conform to surfaces 52 and 54 thereby forming a sealed condition therewith. At the same time, seal member 38 will deform or displace into into cavities 50, to allow members 56 and 58 to be brought axially closer together. In this regard, it is important to understand that when the axially compressive loading is acting only against the elastomeric seal member 38 and not retainer members 12 and 26, due to the greater axial extent and relative softness of seal member 38 compared to the retainer members 12 and 26, the joint separation load is smaller than if the loading were also acting against the retainer members 12 and/or 26. This enables using fewer and/or smaller members such as bolts or the like for bringing the joint together, which is a cost advantage. Also, sufficient volume can be provided by the remaining portions of space 36 and cavities 50 to allow surfaces 52 and 54 to be brought into at least substantial abutment with axial end portions 18, 20, 28 and 30 of retainer members 12 and 26, as shown in FIG. 3. This serves to enclose elastomeric seal member 38 between retainer members 12 and 26, and surfaces 52 and 54, to prevent extrusion of seal member 38 radially inwardly into area 14, and radially outwardly into any space between members 56 and 58, such as gap 60 shown, when subject to high differential pressure conditions on opposite sides thereof. Gap 60 can extend completely or only partially around seal 10 and provides an inspection port to allow visually verifying the presence of seal 10 and/or determining if leakage or another problem with seal 10 is present. Retainer members 12 and 26 serve to protect seal member 38 from substances contained in area 14 or penetrable from the environment through gap 60 which can harm or degrade seal member 38. Because seal member 38 is protected from extrusion, the seal area requirement is lessened, which further lessens the joint separation load and the fastener requirement.

Here, it should be recognized and understood that although the remaining portions of space 36 and cavities 50 as shown have a combined volume that is sufficiently large so as to provide areas for the expansion or displacement of seal member 38 as it is conformed to surfaces 52 and 54 to allow retainer members 12 and 26 to contact surfaces 52 and 54, such volume can alternatively be larger or smaller, as desired. Further in this regard, retainer member 12 and/or retainer member 26 can optionally be greater in axial extent so as to be compressed between opposing surfaces such as surfaces 52 and 54, as desired.

To facilitate assembly of members 56 and 58, surface 52 and/or surface 54 can be formed using conventional counterboring or spot facing techniques so as to be located at very precise axial distances from surfaces 62 and 64 of members 56 and 58. Because of this precise capability, multiple surfaces such as surfaces 52 and 54, can be produced on members such as members 56 and 58, at different locations thereon, and a plurality of face seals 10 used for simultaneously forming sealed conditions therebetween as members 56 and 58 are assembled. As a further feature, retainer member 12 and/or retainer member 26 can be adapted for cooperatively engaging a radially facing surface, such as radially facing surface 66 of member 56 for holding or retaining face seal 10 during assembly and disassembly with another member, such as member 58 as shown.

Referring briefly to FIG. 4, face seal 10 is shown installed between two different members 68 and 70 of an assembly, for forming a sealed condition between spaced, opposed surfaces 52 and 54 of the members 68 and 70. Surfaces 52 and 54 are located a precise, predetermined distance from outer surfaces 72 and 74 of the members 68 and 70 such that surfaces 72 and 74 are brought into abutting relation when members 68 and 70 are assembled. Here, it should be understood that retainer members 12 and/or 26 can have axial extents allowing those members to be brought into abutment with surfaces 52 and 54, compressed between those surfaces, or spaced therefrom, when members 68 and 70 are assembled, as desired. Space 36 and cavities 50 can likewise have a combined volume to allow deformation of seal member 38 to provide a desired sealed condition with surfaces 52 and 54. Likewise, the embodiment of FIG. 4 could have a gap 60 extending partially around the seal 10.

Industrial Applicability

The present face seal has utility for sealing spaced, opposed surfaces of a wide variety of members, including, but not limited to, hydraulic components, such as valve bodies, pump and motor housings, manifolds, and the like, as well as engine and power train components and the like. The present face seal can have a wide variety of shapes in addition to the annular shape shown, including, but not limited to, oval, rectangular, and other polygonal shapes. The present face seal has particular utility for use in counterbores and spot faces due to the positioning and protection for the seal member provided by the retainer members, and the uniform sealing conditions that can be achieved when multiple seals are used. Because the need for lapping, grinding or milling one or both of the opposed surfaces to be sealed is eliminated, costs are reduced.

Other aspects, objects and advantages of the present invention can be obtained from a study of the drawings, the disclosure and the appended claims.

What is claimed is:

1. A face seal for forming a sealed condition between two spaced, opposed surfaces, comprising:

an inner seal retainer member defining an area having an axis therethrough, the inner seal retainer member having a first axial end portion, an opposite second axial end portion, a plurality of corrugations formed thereon between the first and second axial end portions, and an axial extent as measured between the first axial end portion and the second axial end portion;

an outer seal retainer member including a first axial end portion, an opposite second axial end portion, a plurality of corrugations formed thereon between the first and second axial end portions, and an axial extent as measured between the first axial end portion thereof and the second axial end portion thereof, the outer seal retainer member being disposed radially outwardly of the inner seal retainer member defining a space therebetween; and an elastomeric seal member disposed in a predetermined portion of the space between the inner seal retainer member and the outer seal retainer member, the elastomeric seal member having a first axial sealing face, an opposite second axial sealing face, and an axial extent as measured between the first axial sealing axial face and the second axial face when in a free state which is greater than the axial extents of the seal retainer members, and the seal member being deformable so as to conform to said spaced, opposed surfaces for forming the sealed condition and to expand into at least a portion of the space defined between the seal retainer members when subject to a compressive force applied by the spaced, opposed surfaces.

2. The seal of claim 1, wherein the at least the portion of the space is defined by the plurality of corrugations of the inner and outer seal retainer members.

3. The seal of claim 2, wherein the first and second axial end portions of the outer seal retainer member are operative to move inwardly in response to the first and second axial end portions thereof being compressively engaged by the two spaced, opposed surfaces.

4. The seal of claim 3, wherein the first and second axial end portions of the inner seal retainer member are operative to move inwardly in response to the first and second axial end portions thereof being compressively engaged by the two spaced, opposed surfaces.

\* \* \* \* \*